(No Model.)

H. S. DAGGETT.
MOTOR FOR CLIPPING MACHINES.

No. 422,738. Patented Mar. 4, 1890.

Witnesses:
E. P. Ellis,
L. L. Burket.

Inventor:
H. S. Daggett,
per
F. A. Lehmann,
Atty.

UNITED STATES PATENT OFFICE.

HENRY SMITH DAGGETT, OF LAMAR, COLORADO.

MOTOR FOR CLIPPING-MACHINES.

SPECIFICATION forming part of Letters Patent No. 422,738, dated March 4, 1890.

Application filed July 19, 1889. Serial No. 318,094. (No model.)

*To all whom it may concern:*

Be it known that I, HENRY SMITH DAGGETT, of Lamar, in the county of Prowers and State of Colorado, have invented certain new and useful Improvements in Motors for Hair and Wool Clipping Machines; and I do hereby declare the following to be a full, clear, and exact description of the invention, such as will enable others skilled in the art to which it pertains to make and use it, reference being had to the accompanying drawings, which form part of this specification.

My invention relates to an improvement in motors for hair and wool clipping machines; and it consists in the combination of a driving-pulley which is operated by any suitable power, a shaft which is driven by a belt from the driving-pulley, a pulley upon the shaft, a swinging support in which is journaled a drum or pulley, and a jointed rod or rods by which the clipping-machine is operated, as will be more fully described hereinafter.

The object of my invention is to provide a motor by means of which one or more clipping-machines may be operated, and which will allow the machines to be freely moved around in different directions and freely used in many different positions.

Figure 1:
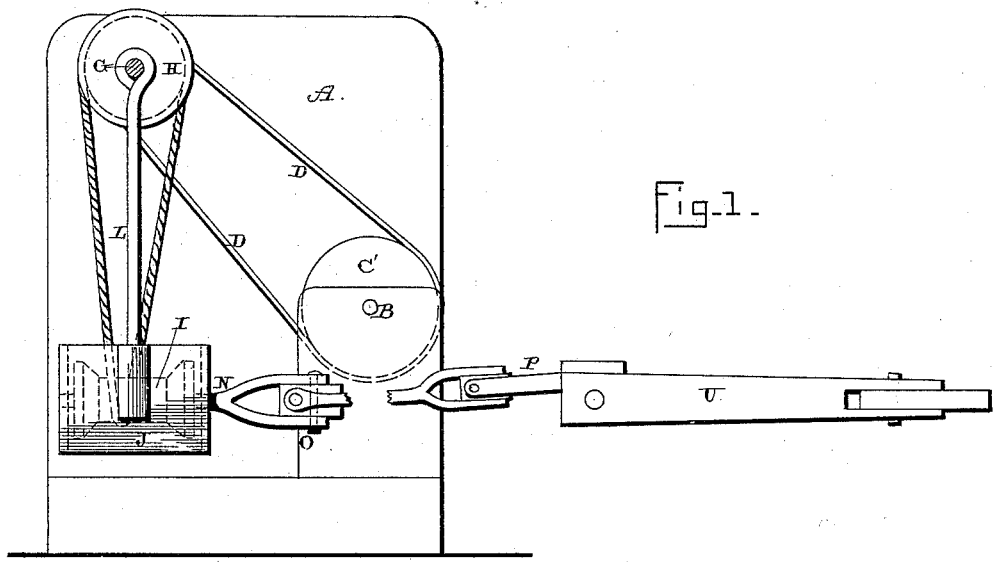
Figure 2:
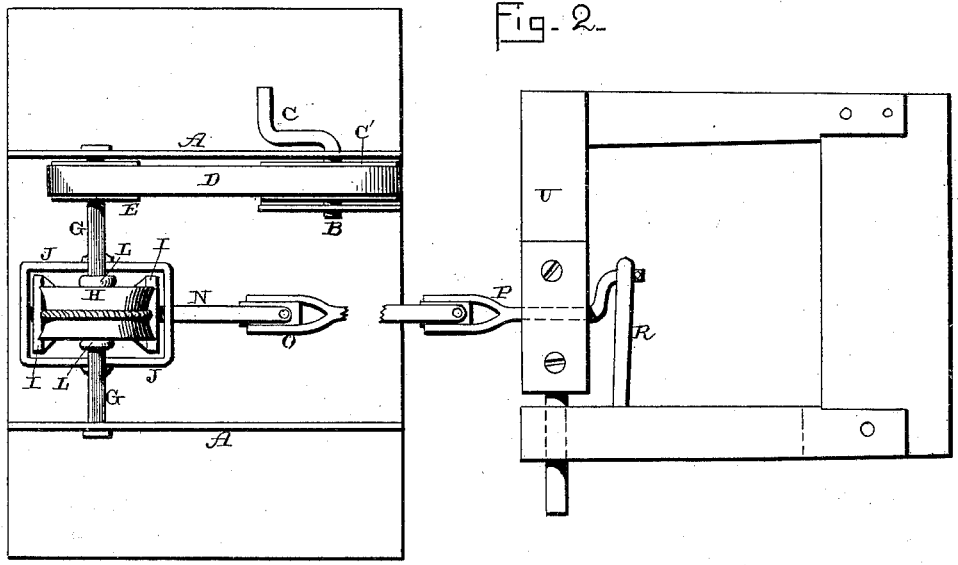

Figure 1 is a side elevation of a machine which embodies my invention, a part of the frame-work being removed. Fig. 2 is a plan view of the same.

A represents a suitable frame-work of any desired construction, and in which the driving-shaft B is journaled. Upon one end of this shaft is formed a crank C, so that the shaft can be operated by hand, steam, horse, or other power, as may be desired. Upon this shaft is secured a driving-pulley C′, and from which extends a belt D over a small pulley E, secured to the shaft G, which is journaled at a higher elevation than the one B. This shaft is raised above the one B, so as to allow a free swinging motion to the parts by which the clippers are to be operated.

Secured to the shaft G is a grooved pulley H, from which a driving cord or belt extends down to and around a drum, cylinder, or pulley I, which is journaled in a frame J, and which drum or pulley has its shaft placed at a right angle to the shaft G. The supporting-frame J is suspended by means of the hangers or rods L from the shaft G, and the upper ends of these hangers are made to catch upon opposite sides of the pulley, as shown, so as to keep the frame J in position under the pulley H. The rods or hangers L allow the frame J to freely move back and forth through a portion of a circle, and thus adapt the clipping-machine to be used in any desired position.

The shaft N, upon which the drum or pulley I is placed, may project through one or both sides of the frame J, and to its outer end is secured by any universal joint a rod, spring, or other suitable device O, which makes connection at its outer end with the short crank-shaft P by means of any suitable universal joint which will allow the parts to be freely used in different positions. The shaft P is made just long enough to pass through the clipper-frame U, and is provided with a crank at its end inside of the frame, and to this crank is connected an operating-rod R, which operates the clipper.

I do not limit myself to the precise arrangement and combination of parts here shown, for any form of universal joint may be used, and instead of a rigid rod, as here shown, any flexible connection may be substituted.

Any desired number of clipping-machines extending in opposite directions may be operated from the shaft G, as may be desired. Only one is here shown; but the shaft G may be made of any length, and any desired number of pulleys may be placed thereon, according to the number of clipping-machines which may be used.

Having thus described my invention, I claim—

In a motor for clipping-machines, the combination of a supporting-frame A, the driving-shaft B, provided with a crank at one end, the driving-pulleys C′ E, the belt D, the operating-shaft G, the pulley H, secured to the shaft G, the hangers L, attached to the shaft at their upper ends, the frame J, supported by the hangers and at right angles to the shaft, the shaft N, journaled in the frame J, the driving-pulley I, secured to the shaft N inside of the frame J, the operating-belt which extends around the pulleys H I, and the jointed rod connected to the shaft N for operating the clipping-machine, substantially as shown.

In testimony whereof I affix my signature in presence of two witnesses.

HENRY SMITH DAGGETT.

Witnesses:
  H. A. BILLOW,
  W. E. COUTANT.